(12) United States Patent
Gupte et al.

(10) Patent No.: US 11,137,165 B2
(45) Date of Patent: Oct. 5, 2021

(54) FAN ARRAY FOR HVAC SYSTEM

(71) Applicant: Johnson Controls Technology Company, Auburn Hills, MI (US)

(72) Inventors: Neelkanth S. Gupte, Katy, TX (US); Tejas Mahendra, Pune (IN); Mukesh Sharma, Pune (IN); Akshay Baljekar, Pune (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 304 days.

(21) Appl. No.: 16/011,420

(22) Filed: Jun. 18, 2018

(65) Prior Publication Data

US 2019/0353387 A1 Nov. 21, 2019

Related U.S. Application Data

(60) Provisional application No. 62/672,957, filed on May 17, 2018.

(51) Int. Cl.
| | |
|---|---|
| *F24F 11/85* | (2018.01) |
| *F25B 49/02* | (2006.01) |
| *F24F 1/00* | (2019.01) |
| *F24F 1/0033* | (2019.01) |

(52) U.S. Cl.
CPC ............ *F24F 11/85* (2018.01); *F24F 1/0033* (2013.01); *F25B 49/02* (2013.01); *F25B 2600/111* (2013.01); *F25B 2600/112* (2013.01)

(58) Field of Classification Search
CPC ................ F25B 49/02; F25B 2600/112; F25B 2600/111; F25B 2600/0253; F25B 39/04; F25B 2339/043; F24F 11/85; F24F 1/16; F24F 1/46; F24F 1/0033; F24F 1/0063; F24F 11/70; F24F 2140/20
See application file for complete search history.

(56) References Cited

U.S. PATENT DOCUMENTS

| | | | |
|---|---|---|---|
| 8,727,700 B2 | 5/2014 | Hopkins | |
| 8,813,512 B2 | 8/2014 | Rajasekaran et al. | |
| 8,849,463 B2 | 9/2014 | Hopkins et al. | |
| 8,963,466 B2 | 2/2015 | Hopkins | |
| 9,677,782 B1 | 6/2017 | Mecozzi | |
| 2009/0112368 A1* | 4/2009 | Mann, III | B64F 1/34 700/275 |
| 2009/0285669 A1* | 11/2009 | Hopkins | F04D 13/06 415/60 |
| 2012/0023940 A1* | 2/2012 | Kitz | F01K 25/08 60/641.2 |
| 2015/0053369 A1* | 2/2015 | Fisher | B60H 1/3227 165/11.1 |

FOREIGN PATENT DOCUMENTS

JP 2013217518 A * 10/2013

* cited by examiner

*Primary Examiner* — Frantz F Jules
*Assistant Examiner* — Martha Tadesse
(74) *Attorney, Agent, or Firm* — Fletcher Yoder, P.C.

(57) ABSTRACT

Embodiments of the present disclosure are directed to a heating and cooling system includes a heat exchanger configured to place an airflow and a refrigerant in thermal communication with one another, where the heat exchanger has a coil and a plurality of fans coupled to the coil, and where the plurality of fans is arranged in an array adjacent to the coil.

23 Claims, 11 Drawing Sheets

FAN ARRAY FOR HVAC SYSTEM

CROSS REFERENCE TO RELATED APPLICATIONS

This application claims priority from and the benefit of U.S. Provisional Application Ser. No. 62/672,957, entitled "FAN ARRAY FOR HVAC SYSTEM", filed May 17, 2018, which is hereby incorporated by reference in its entirety for all purposes.

BACKGROUND

The present disclosure relates generally to heating, ventilation, and air conditioning (HVAC) systems, and specifically, to a fan array for HVAC systems.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Environmental control systems are utilized in residential, commercial, and industrial environments to control environmental properties, such as temperature and humidity, for occupants of the respective environments. The environmental control system may control the environmental properties through control of an airflow delivered to and ventilated from the environment. For example, an HVAC system may use a heat exchanger to transfer heat between the airflow and refrigerant flowing through the system. The heat exchanger may use a fan to direct air across coils of the heat exchanger. It is now recognized that traditional environmental control systems include a fan and/or a fan orifice that may result in increased pressure losses and increased power consumption.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment a heating and cooling system includes a heat exchanger configured to place an airflow and a refrigerant in thermal communication with one another, where the heat exchanger has a coil and a plurality of fans coupled to the coil, and where the plurality of fans is arranged in an array adjacent to the coil.

In another embodiment a heat exchanger system includes a coil configured to flow a refrigerant therethrough, where the coil is configured to be pivotably coupled to a housing of a temperature management system and a fan array coupled to and positioned adjacent the coil, where the fan array has a plurality of fans, and each fan of the plurality of fans is configured to force air across the coil.

In still further embodiments, a temperature management system includes a first heat exchange section having a first heat exchanger, where the first heat exchanger is configured to place a first airflow and a refrigerant in thermal communication with one another and a second heat exchange section having a second heat exchanger, where the second heat exchanger is configured to place a second airflow and the refrigerant in thermal communication with one another, where the second heat exchange section has an array of fans, and where the array of fans is configured to blow the second airflow across a coil of the second heat exchanger.

DRAWINGS

Various aspects of this disclosure may be better understood upon reading the following detailed description and upon reference to the drawings in which.

DETAILED DESCRIPTION

Figure 1:
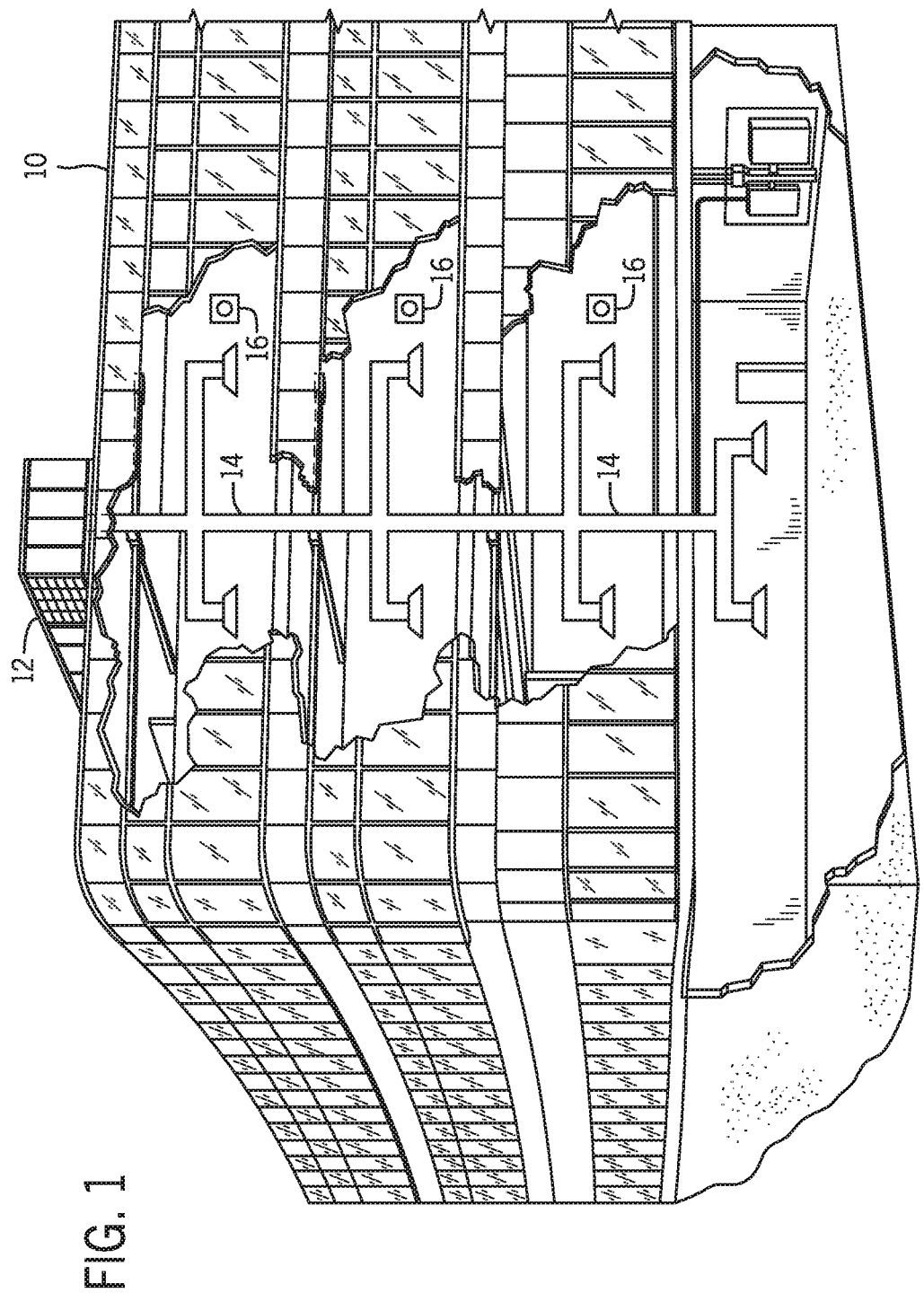
FIG. 1 is a schematic of an environmental control for building environmental management that may employ one or more HVAC units, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to heating, ventilation, and air conditioning (HVAC) systems that use heat exchangers to exchange heat between an airflow and a refrigerant flowing through the HVAC systems. The HVAC system may include fans to direct air across coils of a heat exchanger. The refrigerant is configured to flow through the coils of the heat exchanger such that the air and the refrigerant are in thermal communication with one another.

During operation of the HVAC system, air is drawn and/or blown through a housing having the heat exchanger disposed therein, such as with a fan and/or a fan orifice. In some instances, air enters the housing at an angle relative to an outlet of the air from the housing. As such, pressure is lost from the air changing direction within the housing. To compensate for the pressure loss, the fan may operate at a higher power, which increases energy consumption. Additionally, fans that are included in HVAC systems may be sized to generate a specific amount of airflow, which may affect dimensions of components of the HVAC system, such as the housing. For example, the housing having the heat exchanger may include an increased size to accommodate a fan that is sized to effectively transfer a desired amount of thermal energy between the airflow and a refrigerant via the heat exchanger. As a result, the HVAC system may be difficult to transport and/or operate at relatively low capacity, which may also increase energy consumption. In other cases, a size and/or position of the fan may be limited by dimensions of the housing.

Thus, in accordance with certain embodiments of the present disclosure, it is presently recognized that including an array of fans or a fan array may increase an efficiency of the heat exchanger. Specifically, using an array of small fans may allow for enhanced control of directing air across the heat exchanger. In some embodiments, the array of fans is positioned in a portion of the HVAC system adjacent to heat exchanger coils and replaces a single fan and fan orifice used in existing systems to direct air across the heat exchanger coils. In additional or alternative embodiments, the array of fans is directly coupled to the heat exchanger coils. Individual fans or groups of fans in the array of fans may be independently controlled and thus, enhanced control of the air flow across the heat exchanger may be achieved, thereby increasing an efficiency of the HVAC system. As such, less energy may be consumed to operate the HVAC system. Additionally, the use of the array of fans may eliminate or reduce a number of certain components of the HVAC system, such as blowers, large motors, and panels, which enables the size of the HVAC system to be reduced.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single packaged unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
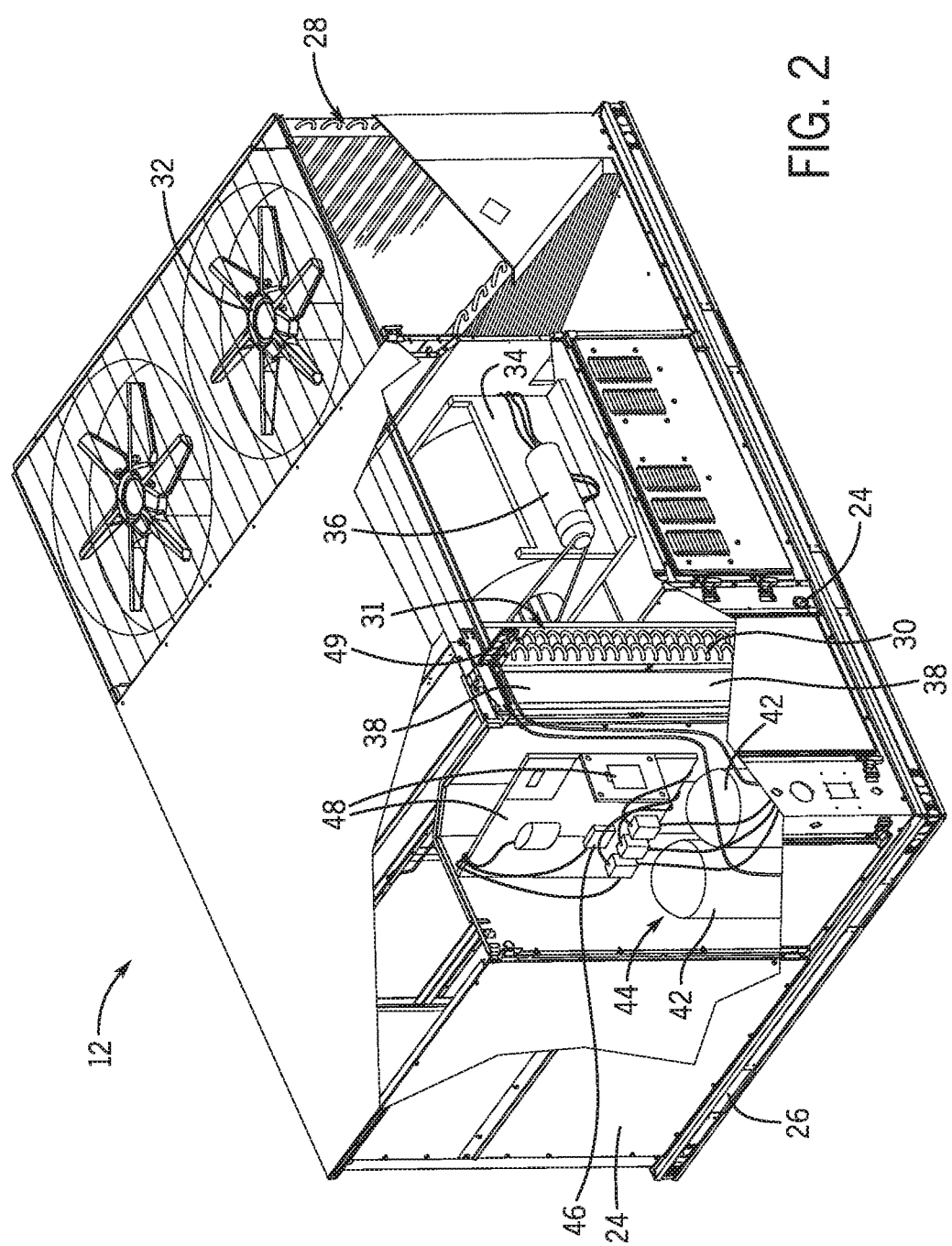
FIG. 2 is a perspective view of an embodiment of the environmental control system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits.

Tubes within the heat exchangers 28 and 30 may circulate refrigerant, such as R-410A, through the heat exchangers 28 and 30. The tubes may be of various types, such as multi-channel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
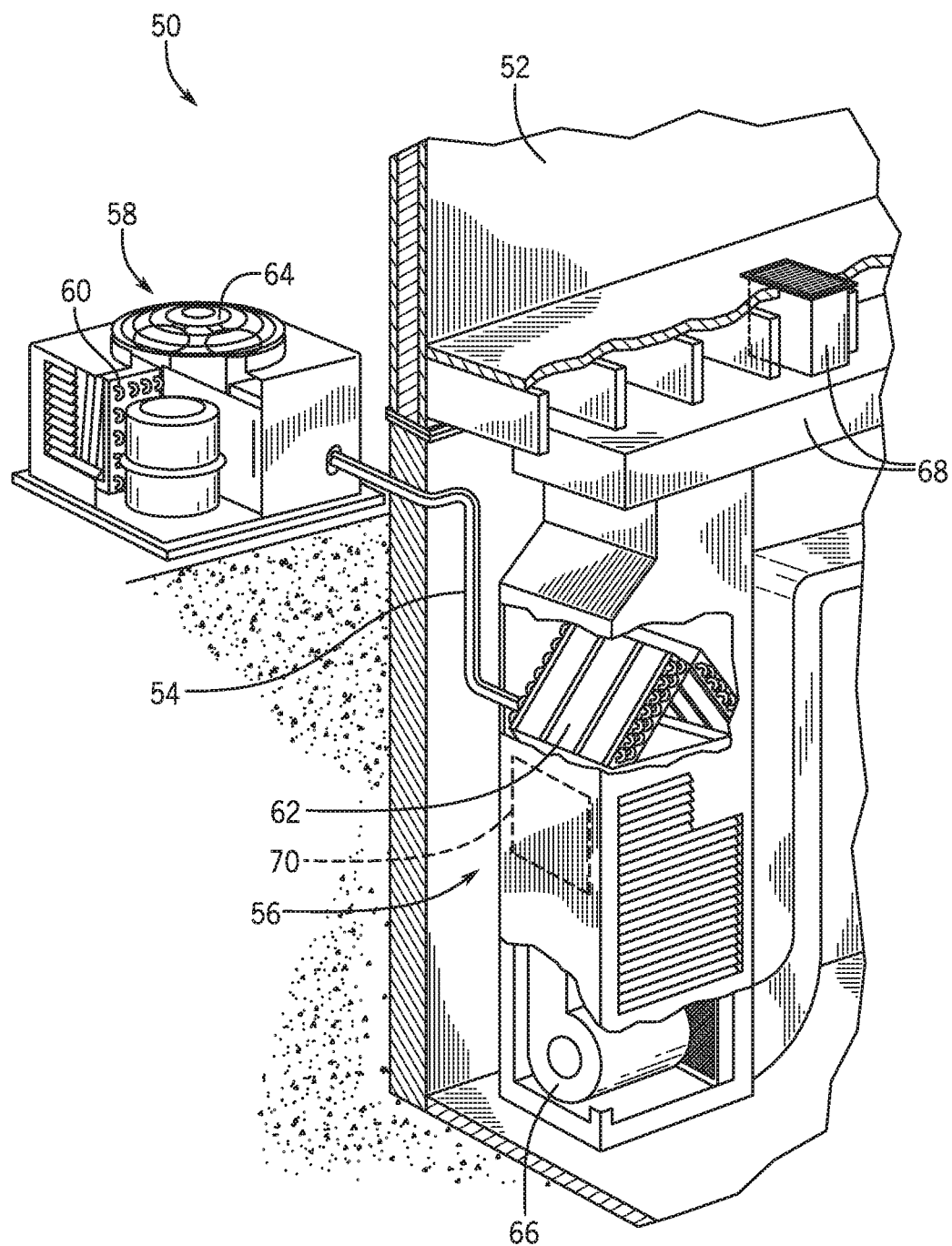
FIG. 3 is a schematic of a residential heating and cooling system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
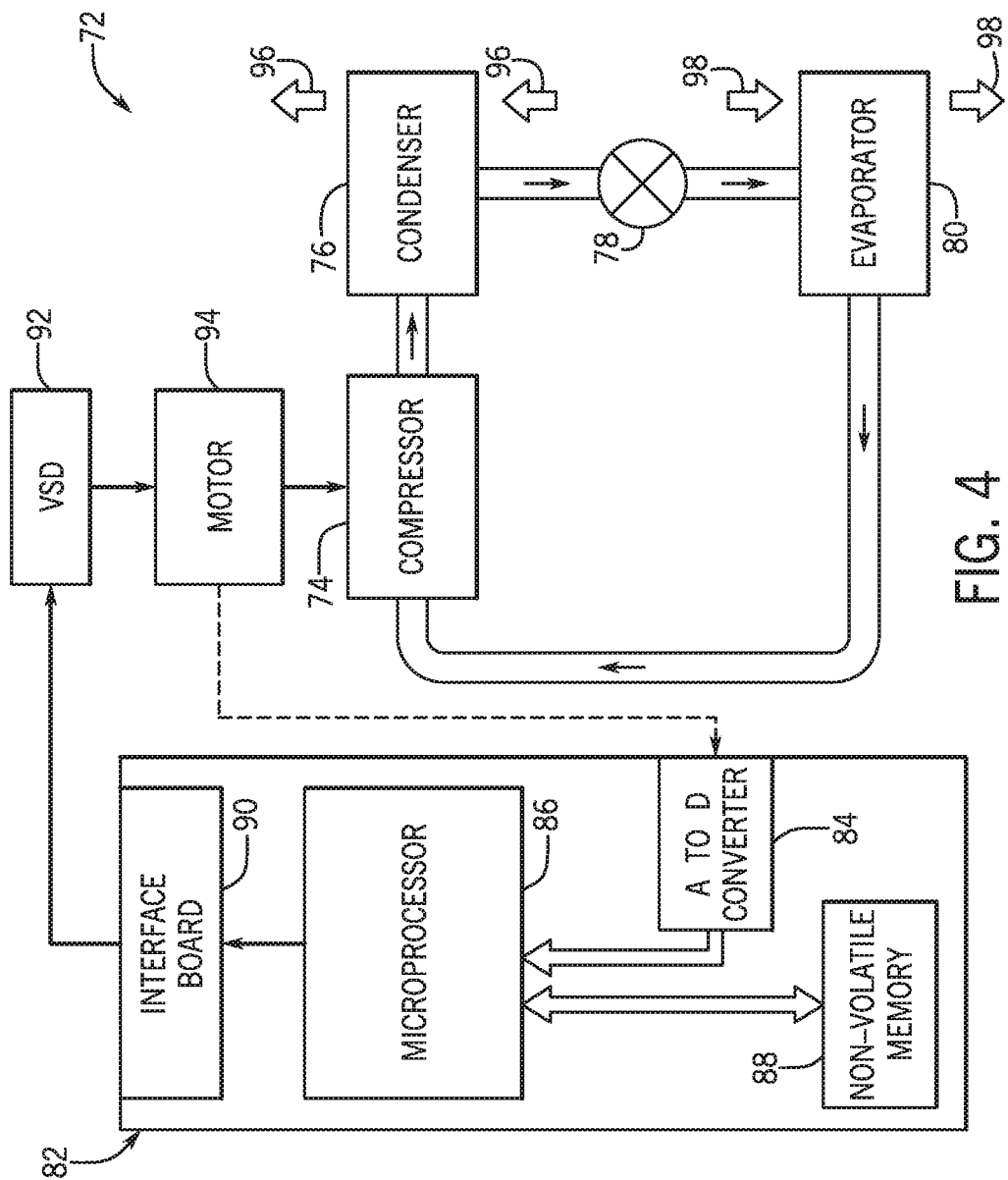
FIG. 4 is a schematic of an embodiment of a vapor compression system that can be used in any of the systems of FIGS. 1-3, in accordance with an aspect the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to temperature management systems, such as mechanical cooling systems, free cooling systems, chiller systems, or other heat pump or refrigeration applications.

As noted above, an HVAC system may include heat exchangers, such as the heat exchanger 28 of FIG. 2, to exchange thermal energy, such as heat, between an airflow and a refrigerant flowing through components of the HVAC system. The HVAC system may use fans to direct air across heat exchanger coils to facilitate heat exchange between the air flowing across the heat exchanger coils and the refrigerant flowing through the heat exchanger coils. In accordance with present embodiments, the fans may be configured as an array of fans, where fans within the array of fans may be independently controlled. In some embodiments, the array of fans is positioned within a portion of the HVAC system, adjacent to heat exchanger coils, to direct air through the portion and across the heat exchanger coils. In additional or alternative embodiments, the array of fans is coupled to the heat exchanger coils, such that the array of fans is adjacent to the heat exchanger coils and directs air across the heat exchanger coils. The array of fans enable enhanced control of the airflow and may increase an efficiency of the heat exchanger and/or the HVAC system. It should be appreciated that while this disclosure focuses on implementing the array of fans in single packaged units having heat exchangers with wrap-around coils, the array of fans may be implemented on different types of HVAC units having different types of heat exchangers.

Figure 5:
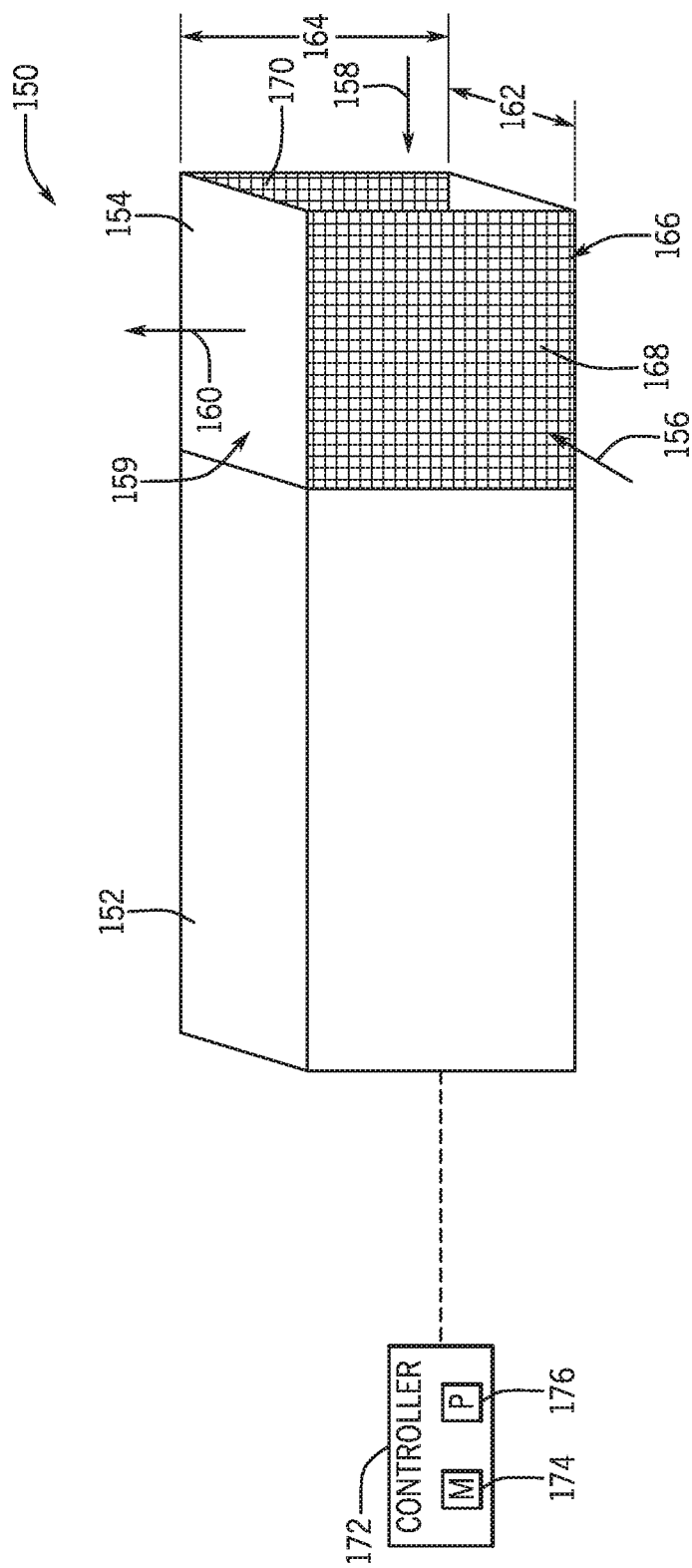
FIG. 5 is a perspective view of an embodiment of an HVAC system using a fan array to direct air through a portion of an enclosure of the HVAC system, in accordance with an aspect of the present disclosure.

To illustrate an embodiment of the array of fans, FIG. 5 is a perspective view of an embodiment of an HVAC system 150, such as the HVAC unit 28 and/or the outdoor unit 58, with a first portion 152, or a first heat exchange section 152, and a second portion 154, or a second heat exchange section 154. The HVAC system 150 may be a single packaged unit, such as the HVAC unit 12 of FIG. 2, where the first portion 152 and the second portion 154 are adjacent to one another, but are isolated sections within the HVAC system 150 with respect to corresponding airflows through the first portion 152 and the second portion 154. In some embodiments, the first portion 152 includes components, such as an evaporator configured to transfer thermal energy from a first airflow to the refrigerant, and the second portion 154 includes components, such as a condenser configured to transfer thermal energy from the refrigerant to a second airflow during operation of the HVAC system 150. Refrigerant may flow through the first portion 152 to the second portion 154 and the refrigerant exchanges heat with the second airflow in the second portion 154. As an example, the second airflow enters the second portion 154 via a direction 156 and a direction 158, flows across heat exchanger coils within the second portion 154, and exits the second portion 154 through an outlet 159 and in a direction 160. Traditionally, a panel is positioned at the outlet 159 where the second airflow exits the second portion 154 and the panel includes a single fan disposed in a fan orifice to draw the airflow through the fan orifice and the outlet 159. A size of the single fan may depend on dimensions of the second portion 154. For example, the diameter of the single fan may depend on a width 162 of the second portion 154. Furthermore, the size of the second portion 154 may depend on a configuration of the fan, such as a capacity, a size, or another suitable parameter. By way of example, the fan is coupled to a motor and a height 164 of the second portion 154 may depend on the dimensions of the motor and/or positioning of the motor. In addition to limiting specifications of the second portion 154, the direction 156 and the direction 158 are at an angle with respect to the direction 160, thereby forcing the airflow to change direction when traveling through the second portion 154 and resulting in pressure loss. The pressure loss may be mitigated by operating the fan at an increased power, leading to higher energy consumption.

In accordance with some embodiments of the present disclosure, an array of fans or a fan array 166 replace the fan and fan orifice, where each fan of the array of fans 166 is smaller in size than the replaced fan. As shown in FIG. 5, the array of fans 166 is positioned where airflow is drawn into the second portion 154, which may include sides 168 and/or 170 of a housing of the second portion 154, where the sides 168 and/or 170 are perpendicular to the direction 160 of the airflow exiting the second portion 154. Each array of fans 166 includes a plurality of fans. In some embodiments, the plurality of fans is disposed evenly throughout the sides 168 and/or 170, such as in rows and/or columns. In additional or alternative embodiments, the plurality of fans is disposed unevenly and a position of each fan of the plurality of fans may depend on various aspects of the HVAC system, such as a configuration of the components within the second portion 154, a desired direction of air flowing into or out of the second portion 154, another aspect of the HVAC system, or any combination thereof. The array of fans 166 may consume a greater surface area of the HVAC system when compared to existing, single fans, while enabling delivery of substantially the same volume of airflow at a reduced pressure drop. As such, operating the array of fans 166 increases efficiency of the HVAC system and consumes less power.

In certain embodiments, the plurality of fans may be independently controllable. That is, operation parameters of the fans, such as fan speed, revolutions per minute (RPM), angle, another parameter, or any combination thereof, may be individually controllable for each fan or a group of fans in the fan array via a control system, such as the control board 48 and/or the control panel 82. In this manner, a motor may be coupled to each individual fan, such as via micro-motors or an integrated fan and motor assembly, and/or a motor may be coupled to a group of fans to control operation of the corresponding group of fans. The fans may be controlled via alternating current (AC) or direct current (DC) provided to the fans from the motors. The independent control may optimize airflow over coils of a heat exchanger within the second portion 154 to further increase efficiency of the second portion 154. For example, the fans adjacent to the heat exchanger coils of the second portion 154 may be operated at a higher RPM than fans positioned further from the heat exchanger coils, such that there is a greater volume of air flowing directly across the heat exchanger coils. Control of each fan may additionally depend on other operation parameters of the HVAC system 150, such as a size of each fan, a distance from each fan to components within the second portion 154, a desired temperature of the airflow, a refrigerant temperature, a desired distribution of air, a direction of air flowing into the second portion 154, a desired direction of air flowing out of the second portion 154, another suitable operation parameter, or any combination thereof. Preferred, desired, or optimized operation of each individual fan of the array of fans 166 over a range of operating capacities of the HVAC system may be determined via experimental testing.

Although FIG. 5 illustrates the array of fans 166 positioned where the airflow enters the second portion 154, it should be appreciated that an array of fans 166 may also be positioned where the airflow exits the second portion 154 or at any other suitable location in the second portion 154. Additionally, the array of fans 166 may also be included in the first portion 152. As mentioned, the array of fans 166 may replace components such as a fan and/or a blower, but it should also be appreciated that the array of fans 166 may be used in combination with existing fans, blowers, or other devices configured to direct a flow of air to increase a volumetric airflow. While the illustrated embodiments of FIG. 5 shows the first portion 152 and the second portion 154 as substantially box-shaped, the first portion 152 and the second portion 154 may be of any suitable shape and the array of fans 166 may be disposed at any suitable location in the first portion 152 and/or the second portion 154.

The HVAC system 150 may be coupled to a controller 172, such as the control panel 82, to control components of the HVAC system 150, such as operation of the first and second portions 152, 154, and/or the array of fans 166. The controller 172 may include a memory 174 and a processor 176. The memory 174 may be a mass storage device, a flash memory device, removable memory, or any other non-transitory computer-readable medium that contains instructions regarding control of the HVAC system 150. The memory 174 may also include volatile memory such as randomly accessible memory (RAM) and/or non-volatile memory such as hard disc memory, flash memory, and/or other suitable memory formats. The processor 176 may execute the instructions stored in the memory 174.

Figure 6:
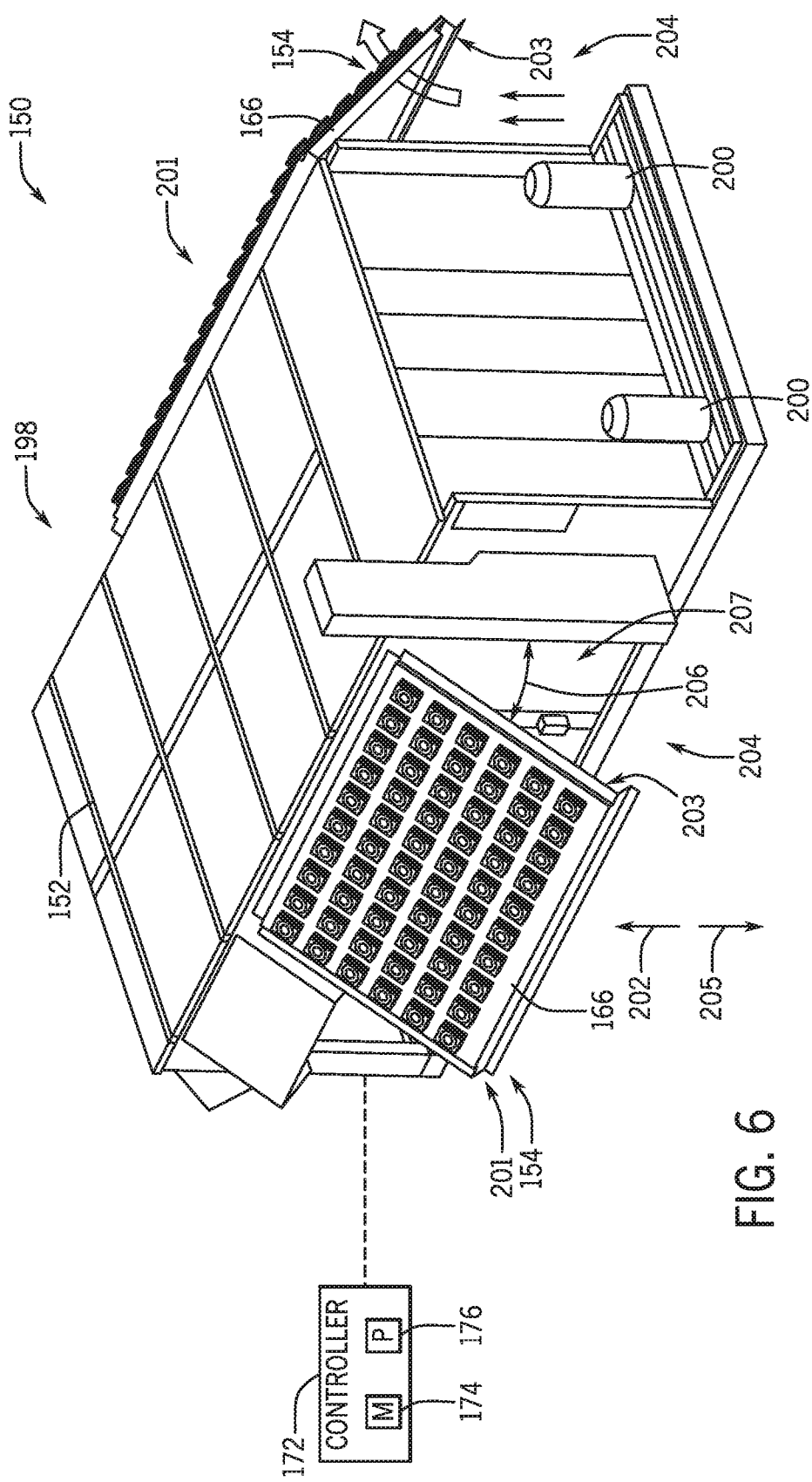
FIG. 6 is a perspective view of an embodiment of an HVAC system using a fan array coupled to a heat exchanger housing to direct air through the heat exchanger housing in an operating configuration, in accordance with an aspect of the present disclosure.

Another embodiment of the array of fans 166 is illustrated in FIG. 6, which is a perspective view of an embodiment of the HVAC system 150 in an operating configuration 198. This embodiment of the HVAC system 150 includes compressors 200 configured to pressurize refrigerant to direct the refrigerant into components housed within the first portion 152, or the first heat exchange section 152, and the second portion 154, or the second heat exchange section 154, such that the refrigerant may exchange heat with an airflow circulating in the direction 202 towards the second portion 154. In some embodiments, the second portion 154, or the second heat exchange section 154, includes a pivoting heat exchanger assembly 201. For instance, the pivoting heat exchanger assembly 201 may be pivotably coupled to the first portion 152, such as via a hinge. Furthermore, the position of the pivoting heat exchanger assembly 201 may be set via clamps to lock the hinge, stands that hold the position of the pivoting heat exchanger assembly 201, and/or braces that substantially maintain the position of the pivoting heat exchanger assembly 201 with respect to a lateral side 204 of the first portion 152. In some embodiments, the pivoting heat exchanger assembly 201 includes the fan array 166 and a heat exchanger coil 203, where the fan array 166 is positioned adjacent to the heat exchanger coil 203, and thus, the fan array 166 is configured to force an airflow across the heat exchanger coil 203. As shown in the illustrated embodiment of FIG. 6, the second portion 154 may include two of the pivoting heat exchanger assemblies 201 coupled to opposite sides 204, or the lateral sides 204, of the first portion 152.

In certain embodiments, the array of fans 166 is coupled atop the heat exchanger coil 203 with respect to the direction 202 and therefore draws the airflow through the heat exchanger coil 203. In other words, the fan array 166 is coupled to a downstream side of the heat exchanger coil 203 with respect to the airflow in the direction 202. In additional or alternate embodiments, the array of fans 166 is coupled to a bottom of the heat exchanger coil 203, or upstream portion of the heat exchanger coil 203, with respect to the direction 202 and blows the airflow across the heat exchanger coil 203. In further embodiments, air flows in a direction 205, opposite the direction 202, and thus, the array of fans 166 coupled atop the heat exchanger coil 203 blows the airflow through the heat exchanger coil 203. Similarly, when the array of fans 166 is coupled to the bottom of the heat exchanger coil 203 with respect to the direction 202, the array of fans 166 include draw through fans. Blow through and draw through configurations of the fans may also be adjusted via changing the direction of rotation of fans of the array of fans 166. In any case, the array of fans 166 may be positioned, such that fans are adjacent to an entire area of the heat exchanger coils of the second portion 154. This configuration increases the surface area for fans to direct airflow over the heat exchanger coils.

Individual fans or groups of fans of the array of fans 166 may be independently controllable in the same manner and/or based on the same parameters as the fans of FIG. 5, which may be via the controller 172. As such, each array of fans 166 may be independently controlled to direct air across the respective heat exchanger coils of the second portion 154. Moreover, FIG. 6 illustrates the pivoting heat exchanger assembly 201 positioned at an angle 206 relative to a side 207, or lateral side 207, of the first portion 152. In certain embodiments, the angle 206 is adjustable and selected or optimized to enable a preferred or target heat transfer rate. For example, in some embodiments, the angle 206 may be approximately 45°. The angle 206 may depend on operation parameters of the HVAC system 150, such as a desired direction of airflow, a position of the pivoting heat exchanger assembly 201 and/or the second portion 154 with respect to the first portion 152, a dimension of the first portion 152, another suitable operation parameter, or any combination thereof, in order to enhance an amount of heat exchange between the airflow and the refrigerant flowing through the heat exchanger coils of the second portion 154.

Figure 7:
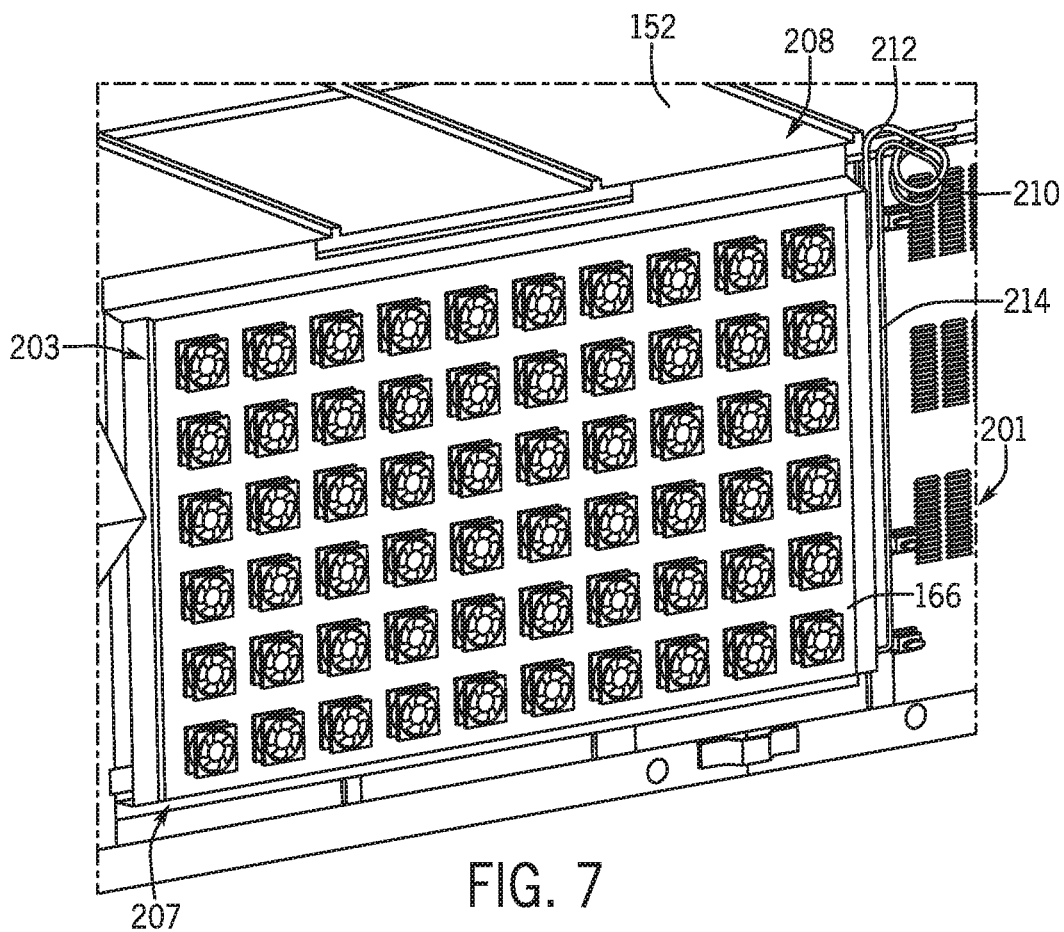
FIG. 7 is a perspective view of an embodiment of a pivoting heat exchanger assembly having a fan array and a heat exchanger coil for the HVAC system of FIG. 6, in accordance with an aspect of the present disclosure.

FIG. 7 is a perspective view of the pivoting heat exchanger assembly 201 having the fan array 166 and the heat exchanger coil 203. As shown in the illustrated embodiment of FIG. 7, the fan array 166 is coupled to the heat exchanger coil 203. For instance, the heat exchanger coil 203 is positioned between the side 207 of a housing 208 of the first portion 152 and the fan array 206. As discussed in detail below, when the angle 206 formed between the pivoting heat exchanger assembly 201 and the side 207 is substantially 0°, or 180°, the HVAC system 150 is in a transportation configuration.

In any case, the heat exchanger coil 203 is configured to flow a refrigerant therethrough, such that the refrigerant is configured to be in thermal communication with the airflow. In some embodiments, the heat exchanger coil 203 may be coupled to additional components that are disposed within the housing 208 of the first portion 152 via flexible conduits 210. In some embodiments, a first conduit 212 directs refrigerant toward the heat exchanger coil 203 from a component within the housing 208. Additionally, a second conduit 214 may return refrigerant flowing through the heat exchanger coil 203 to a component within the housing 208. In some embodiments, the flexible conduits 210, 212, and/or 214 may extend through openings in the housing 208 and couple to additional components within the housing 208, such as another heat exchanger coil, an expansion device, a compressor, or another suitable component. In other embodiments, a component may be disposed external to the housing 208, such that the flexible conduits 210, 212, and/or 214 direct the refrigerant toward the external component. In some cases, the flexible conduits 210, 212, and/or 214 may be coupled to the side 207 of the housing 208.

Figure 8:
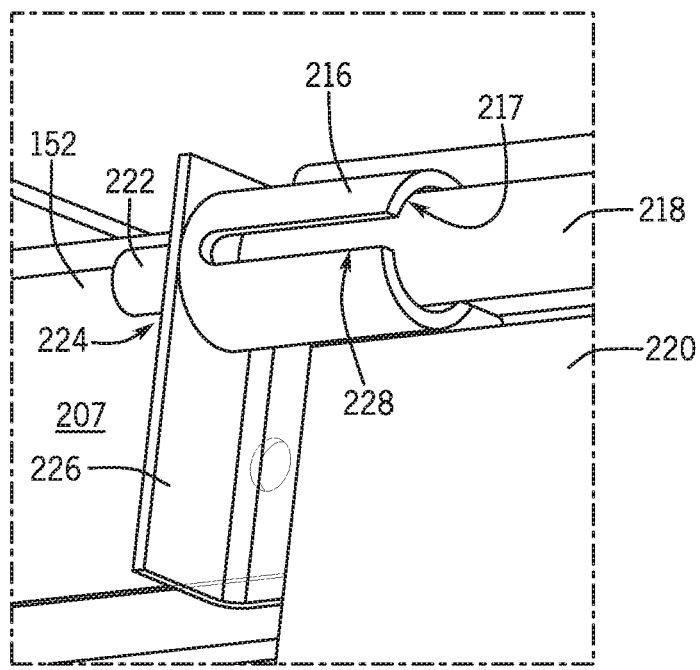
FIG. 8 is an expanded perspective view of an embodiment of a hinge for the pivoting heat exchanger assembly of FIG. 7, in accordance with an aspect of the present disclosure.

As discussed above, the angle 206 of the pivoting heat exchanger assembly 201 may be adjusted via a hinge 216. For example, FIG. 8 is an expanded perspective view of an embodiment of the hinge 216 coupling the pivoting heat exchanger assembly 201, and thus the second portion 154, to the side 207 of first portion 152. As shown in the illustrated embodiment of FIG. 8, the hinge 216 includes an opening 217 configured to receive a rod 218 of the pivoting heat exchanger assembly 201. For instance, the rod 218 of the pivoting heat exchanger assembly 201 is coupled to, or otherwise integrated with, a frame 220 of the pivoting heat exchanger assembly 201 that is also coupled to both the fan array 166 and the heat exchanger coil 203. In any case, the hinge 216 further includes a coupling element 222 configured to be disposed in an opening 224 of a bracket 226 coupled to the lateral side 207 of the first portion 152. As such, the rod 218 is configured to pivot within the opening 217 of the hinge 216, such that the pivoting heat exchanger assembly 201 may pivot with respect to the lateral side 207 of the first portion 152. In some embodiments, the hinge 216 further includes a slot 228 that extends axially along the hinge 216. The slot 228 may be configured to receive protrusions, tabs, or other elements disposed on the rod 218, such that the slot 228 substantially blocks movement of the rod 218 with respect to the lateral side 207 of the first portion 152 when the protrusion, tab, or other element is disposed within the slot 228. For example, the protrusions, tabs, or other elements disposed on the rod 218 may be biased toward the an inner surface of the opening 217 of the hinge 216, such that the protrusions extend into the slot 228 and block movement of the rod 218 upon alignment with the slot 228. As such, the slot 228, the protrusions, tabs or other elements may be utilized to maintain a position of the pivoting heat exchanger assembly 201 with respect to the lateral side 207 of the first portion 152.

Figure 9:
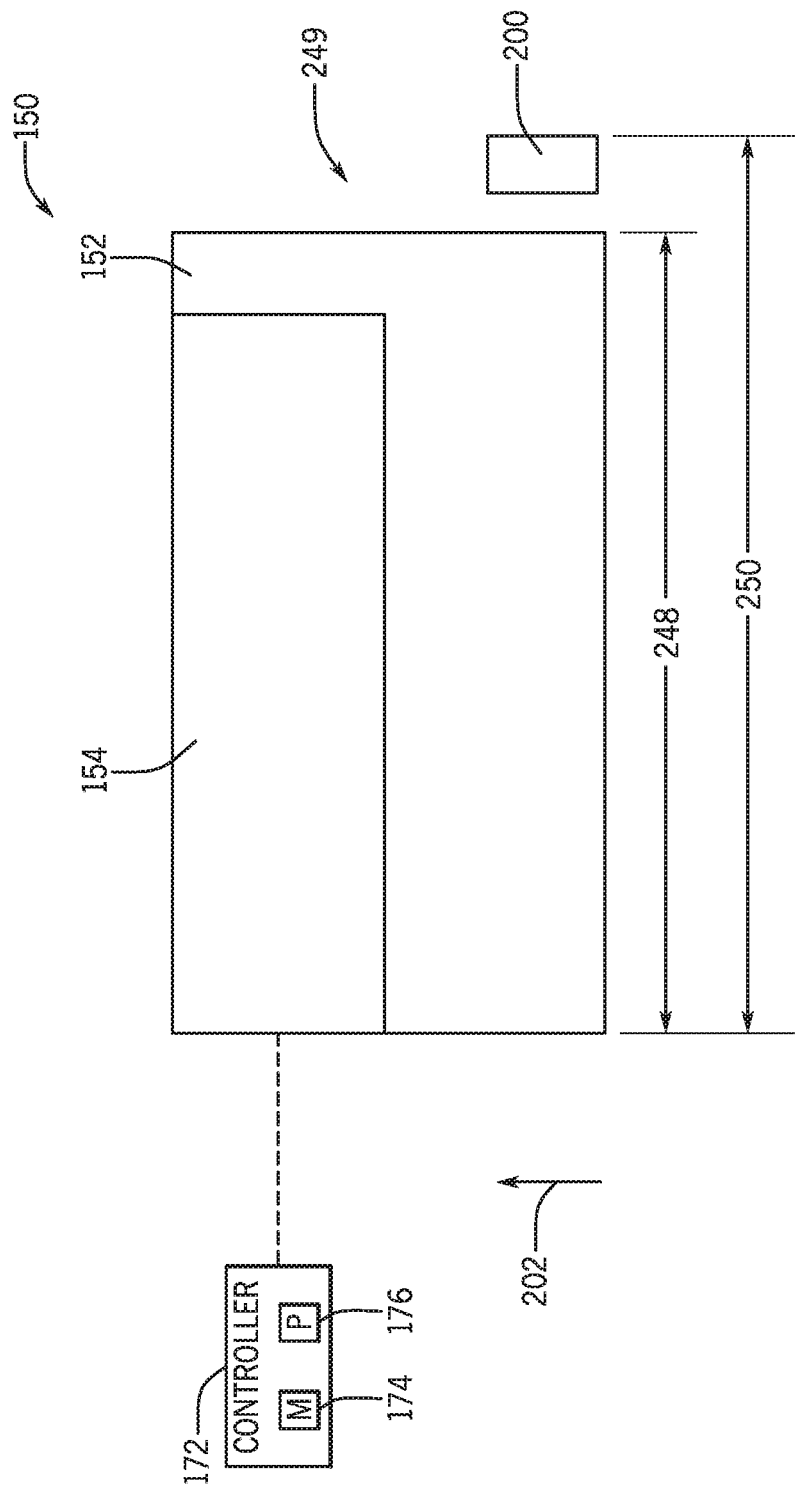
FIG. 9 is a side view of the embodiment of the HVAC system of FIG. 6 in the operating configuration, in accordance with an aspect of the present disclosure.

FIG. 9 is a side view of an embodiment of the HVAC system 150 of FIG. 6, illustrating the difference in size of the HVAC system 150 having the pivoting heat exchanger assembly 201 coupled to the lateral side 207 of the first portion 152 when compared to the embodiment of the HVAC system 150 of FIG. 5. As illustrated by FIG. 9, the pivoting heat exchanger assembly 201 overlaps with the first portion 152 along a length 248 of the first portion 152, as opposed to extending from an end 249 the first portion 152, as shown in FIG. 5. In this manner, a length 250 of the HVAC system 150, or a combined length of the first portion 152 and the second portion 154, is reduced, such as by 20-30%. Further, since air flows in the direction 202 directly across the heat exchanger coil 203 of the pivoting heat exchanger assembly 201, as shown in FIG. 6, the air may not flow into a housing of the second portion 154, which may eliminate redirection of the air in a manner shown in FIG. 5. Accordingly, a reduction in pressure loss may be achieved because the air flowing across the heat exchanger coil 203 of the pivoting heat exchanger assembly 201 no longer changes directions. The decreased pressure loss increases an efficiency of the HVAC system 150.

Figure 10:
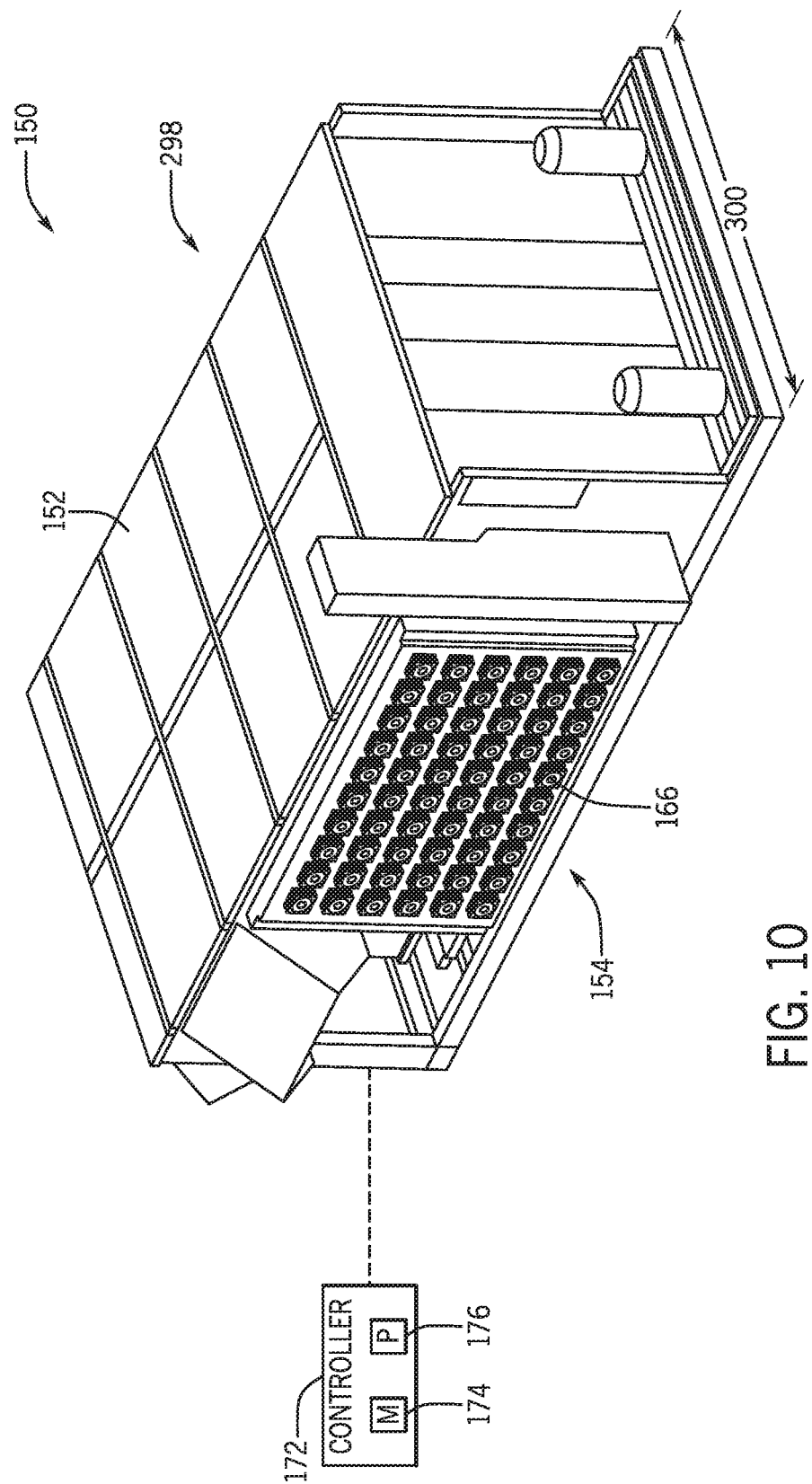
FIG. 10 is a perspective view of the HVAC system of FIGS. 6 and 9 in a transportation configuration, in accordance with an aspect of the present disclosure.

FIG. 10 is a perspective view of an embodiment of the HVAC system 150 of FIGS. 6 and 9 in a transportation configuration 298. In the transportation configuration 298, the fan array 166 and the heat exchanger coil 203 of the pivoting heat exchanger assembly 201 are lowered from the position shown in FIG. 6 to be parallel to the first portion 152. As such, the angle 206 formed between the pivoting heat exchanger assembly 201 and the side 207 of the first portion 152 is approximately 0°, or approximately 180°. As illustrated in FIG. 10, when the fan array 166 and the heat exchanger coil 203 of the pivoting heat exchanger assembly 201 are generally parallel to the first portion 152, a width 300 of the HVAC system 150 is reduced. In some embodiments, the width 300 decreases by 30-40% when the pivoting heat exchanger assembly 201 is generally parallel to the first portion 152. The decrease in the width 300 results in a more compact HVAC system 150 to facilitate transportation and/or installation of the HVAC system 150. That is, the transportation configuration reduces a volume of the HVAC system 150, enabling tighter packaging and/or greater ease in positioning.

Figure 11:
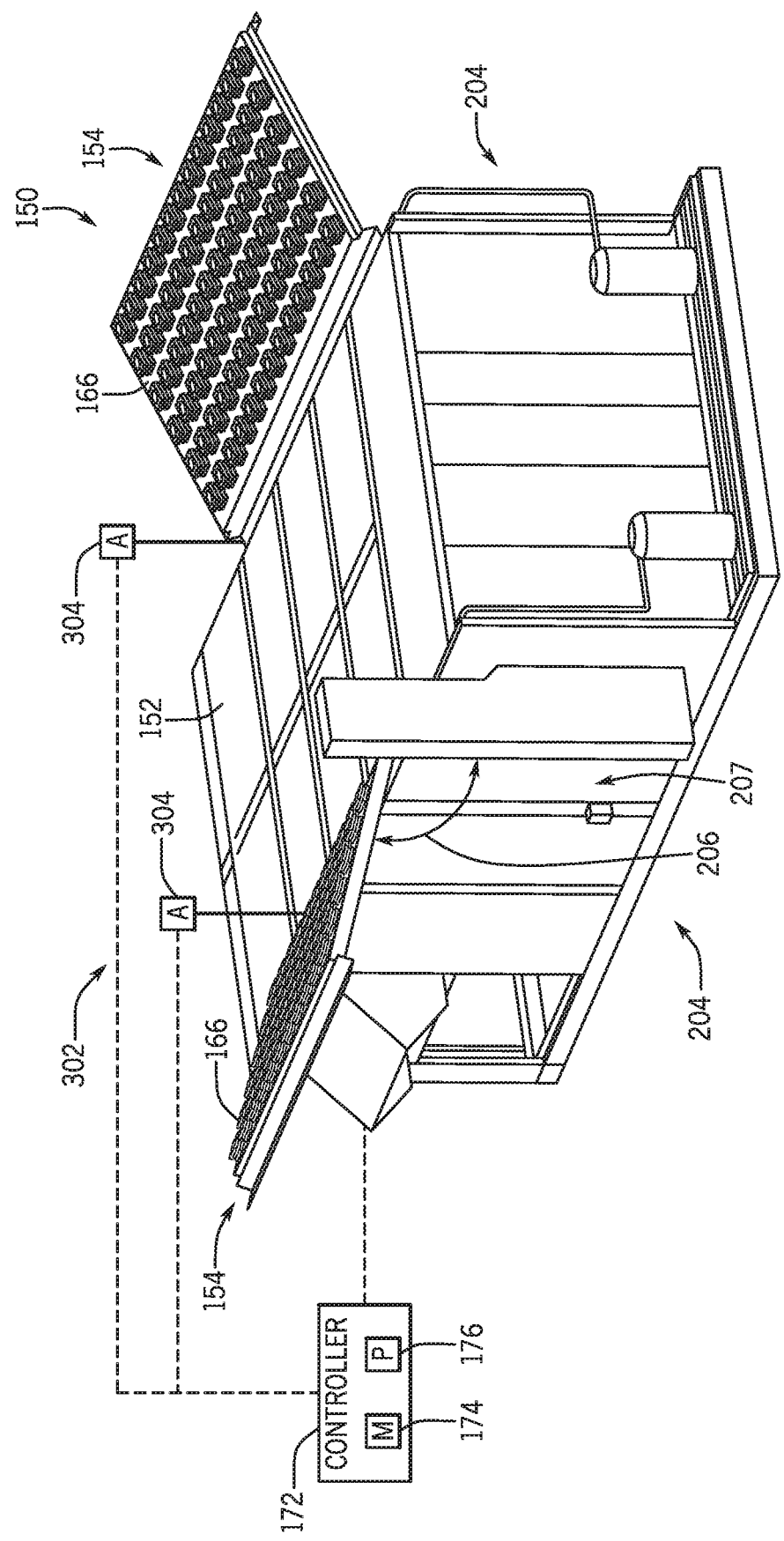
FIG. 11 is a perspective view of the HVAC system of FIGS. 6, 9, and 10 in a maintenance configuration, in accordance with an aspect of the present disclosure.

FIG. 11 is a perspective view of an embodiment of the HVAC system 150 of FIGS. 6, 9, and 10 in a maintenance configuration 302. In the maintenance configuration 302, the pivoting heat exchanger assembly 201 is raised such that the angle 206 is increased. For example, in some embodiments, the angle 206 is between 80° and 150°, between 90° and 120°, or between 100° and 115°. In this manner, a greater surface area of sides 204 of the first portion 152 are exposed in the maintenance configuration 302 when compared to the operating configuration 198 and/or the transportation configuration 298. In some embodiments, the greater exposure of the sides 204 permits maintenance of the first portion 152, such as permitting access to the lateral side 207 of the first portion 152 that is otherwise covered when the angle 206 between second portion 154 and the side 207 is reduced. To enable the second portion 154 to transition from the operating configuration 198 and/or the transportation configuration 298 to the maintenance configuration 302, the angle 206 may be adjustable between 0° and 110°, between 10° and 140°, between 20° and 180°, between any other suitable range of angles, or any combination thereof. The controller 172 may be communicatively coupled to an actuator 304 configured to adjust the angle 206 via instructions stored in the memory 174.

Although FIGS. 6, 10, and 11 depict both pivoting heat exchanger assemblies 201 as being generally self-similar and/or symmetrical to one another, in certain embodiments, the pivoting heat exchanger assemblies 201 are at different angles 206 relative to one another. For example, one pivoting heat exchanger assembly 201 may be in the transportation configuration 298 of FIG. 10, and the other pivoting heat exchanger assembly 201 is in the maintenance configuration 302 of FIG. 11. Additionally, the pivoting heat exchanger assembly 201 may be coupled to different or additional sections of the first portion 152, such as at different sides of the first portion 152 than the sides 204 and/or 207 illustrated in FIGS. 6, 10, and 11.

Figure 12:
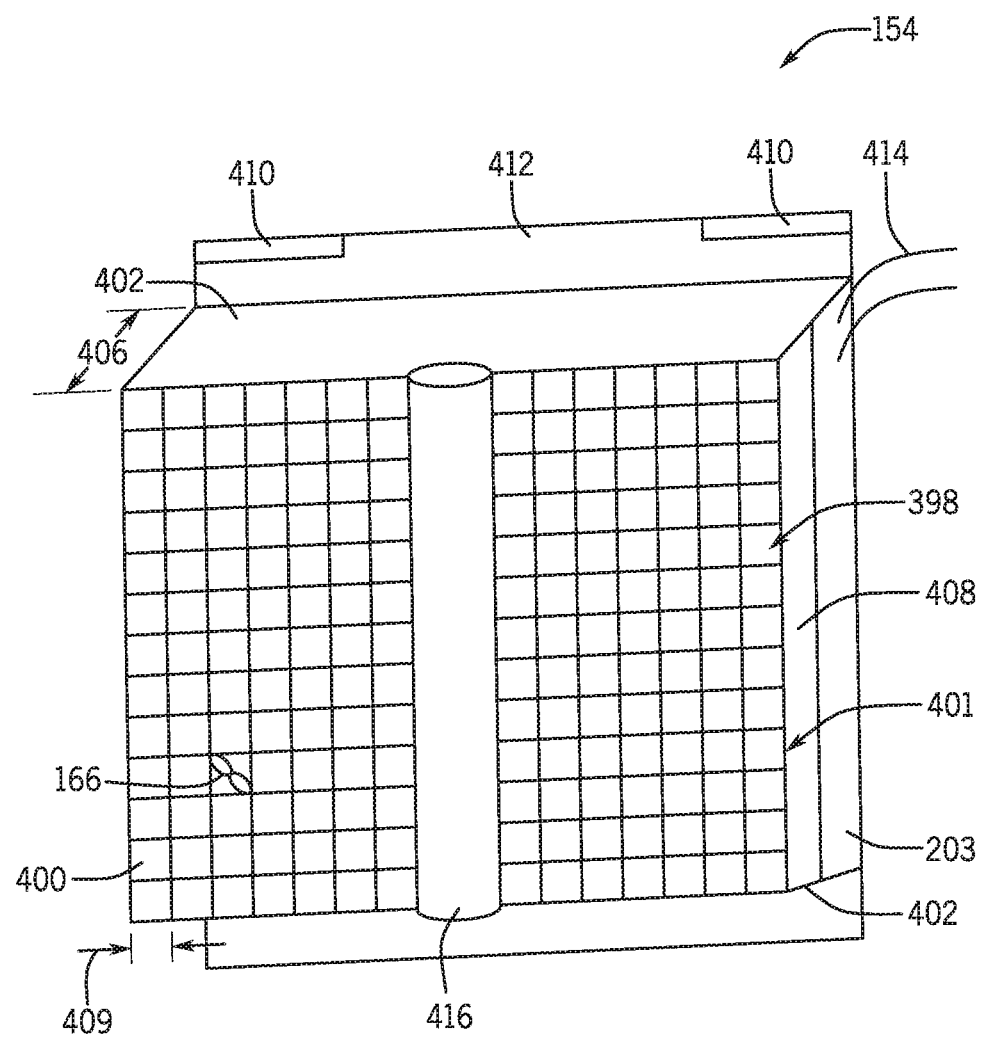
FIG. 12 is a perspective view of an embodiment of a fan array coupled to a heat exchanger that may be implemented in any of the systems of FIGS. 5-11, in accordance with an aspect of the present disclosure.

To illustrate how an array of fans 166 may couple to heat exchanger coils, FIG. 12 is a perspective view of an embodiment of the pivoting heat exchanger assembly 201. As illustrated in FIG. 12, the array of fans 166 includes a bracket 398 with receptacles 400 that form a generally rectangular grid of the array of fans 166. In some embodiments, the bracket 398 may be coupled to or integral with the frame 220, shown in FIG. 8. Fans may be positioned within any or all of the individual receptacles 400. Each receptacle 400 may be substantially the same size as one another and thus, each fan in the receptacle 400 may be approximately the same size. Around a perimeter 401 of the receptacles 400, edges 402 extend substantially perpendicularly from the receptacles 400 to form a cavity. The heat exchanger coil 203 may slide into the cavity formed by the edges 402 to couple the heat exchanger coil 203 to the array of fans 166. The heat exchanger coil 203 may couple to the edges 402 of the array of fans 166, such as via buckles, fasteners, rivets, welds, adhesives, punches, another suitable way of coupling, or any combination thereof.

In some embodiments, the heat exchanger coil 203 may be positioned at a distance 406 away from each fan of the array of fans 166 within each receptacle 400. For instance, a section 408 of the array of fans 166 may be included in the pivoting heat exchanger assembly 201, where the distance 406 is determined to enable more efficient operation of the pivoting heat exchanger assembly 201, such as by increasing a distribution of airflow. The section 408 may hold the position of the heat exchanger coil 203 while still permitting air to flow from the array of fans 166 across the heat exchanger coil 203. In certain embodiments, the distance 406 is based at least in part on a diameter 409 of the fans of the array of fans 166. For example, in some embodiments, the fans are of substantially the same diameter 409, which may be between 1 centimeter and 10 centimeters, and the distance 406 is between 0.5 times and 5 times the diameter 409 of the fans. However, in additional or alternative embodiments, the fans are of different diameters 409 and the distance 406 is between 0.5 times and 5 times the diameter 409 of the smallest and/or largest fan diameter 409. The size and configuration of the fans may depend on any of the aforementioned operation parameters of the HVAC system discussed herein, such as a desired temperature of the airflow, a refrigerant temperature, a desired distribution of air, a desired direction of air flowing into the pivoting heat exchanger assembly 201, a desired direction of air flowing out of the pivoting heat exchanger assembly 201, another suitable operation parameter, or any combination thereof. In some embodiments, the array of fans 166 are generally parallel to the heat exchanger coil 203, but in additional or alternative embodiments, the array of fans 166 are at an angle with respect to the heat exchanger coil 203 and thus, fans may be at different distances 406 away from the heat exchanger coil 203. In such embodiments, the smallest distance 406 may be between 0.5 times and 5 times the diameter 409 of the fans.

The array of fans 166 includes coupling points 410 to couple the pivoting heat exchanger assembly 201 to the first portion 152. The coupling points 410 may be hinges, such as the hinge 216, pivots, another component, or any combination thereof to couple the pivoting heat exchanger assembly 201 to the first portion 152 while permitting rotation of the pivoting heat exchanger assembly 201 with respect to the first portion 152. The coupling points 410 may be positioned on one of the edges 402 or on a flange 412 extending from one of the edges 402. Additionally, tubing 414, such as the flexible conduits 210, attaches to the heat exchanger coils 404 to permit refrigerant to flow through the heat exchanger coils 404. The tubing 414 may include flexible material, such as rubber, nylon, vinyl, polyethylene, another material, or any combination thereof to permit movement of the second portion 154 relative to the first portion 152. The array of fans 166 may also include a sleeve 416 configured to organize and/or otherwise direct wires of the fans toward the controller 172. That is, the wires are routed within the sleeve 416, which may be positioned atop the side of the partitions 400, where the sleeve 416 may be centered or positioned offset with respect to the bracket 398. This organizes the wiring of the array of fans 166 to decrease the likelihood that a wire would interfere with operation of the array of fans 166 and/or movement of the pivoting heat exchanger assembly 201.

Although FIG. 12 illustrates one array of fans 166 in fluid communication with the heat exchanger coil 203, in additional or alternative embodiments, there may be additional array of fans 166 stacked atop one another and also in fluid communication with the heat exchanger coil 203. The additional array of fans 166 may be coupled to one another via the same or similar methods to couple the array of fans 166 to the heat exchanger coil 203. The stacks of arrays of fans 166 may be independently controlled to provide even greater control of directing air across the heat exchanger coil 203. Additionally, although the pivoting heat exchanger assembly 201 of FIGS. 6-12 is illustrated as generally rectangular in shape, it should be appreciated that the pivoting heat exchanger assembly 201 may be any other suitable shape. That is, the array of fans 166 and/or the heat exchanger coil 203 may be a different shape than illustrated. In some embodiments, the shape of the array of fans 166 is different than the shape of the heat exchanger coil 203, but still encompasses an area of the heat exchanger coil 203.

As set forth above, embodiments of the present disclosure may provide one or more technical effects useful in the operation of HVAC systems. For example, an array of fans may be implemented to direct air across components of the HVAC system. By enabling independent control of fans within the array of fans, there is greater control of directing the air over the components. Control of the fans may optimize heat exchange between the air and the refrigerant and decrease pressure drop to increase an efficiency of the HVAC system. In some embodiments, the HVAC system includes multiple portions and the array of fans directs airflow through at least one housing of the portions. In additional or alternative embodiments, the array of fans is coupled to coils of a heat exchanger to cover a surface area of the coils. In such embodiments, the coils of the heat exchanger may be pivotably coupled to a housing of the HVAC system and therefore are configured to change a size of the HVAC system. For example, the size of the HVAC system may be adjusted for transporting and/or maintenance of the HVAC system when transitioned between positions. As should be understood, the array of fans may be implemented for a condenser, an evaporator, and/or another heat exchange component of the HVAC system. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, mounting arrangements, use of materials, colors, orientations, and the like, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosed embodiments, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating and cooling system, comprising:
a heat exchanger configured to place an airflow and a refrigerant in thermal communication with one another, wherein the heat exchanger comprises a coil and a plurality of fans coupled to the coil, wherein the plurality of fans is arranged in an array adjacent to the coil, and wherein the heat exchanger is movably coupled to a housing of the heating and cooling system such that the coil and the plurality of fans are configured to collectively move relative to the housing.

2. The heating and cooling system of claim 1, comprising a controller, wherein the controller is configured to instruct an actuator to position the heat exchanger in a first position relative to the housing in an operating configuration of the heating and cooling system and to instruct the actuator to position the heat exchanger in a second position relative to the housing in a non-operating configuration of the heating and cooling system.

3. The heating and cooling system of claim 2, wherein, in the first position, the heat exchanger is oriented at an obtuse angle relative to a lateral side of the housing, and, in the second position, the heat exchanger is positioned substantially parallel to the lateral side of the housing.

4. The heating and cooling system of claim 3, wherein the heat exchanger is configured to be secured at the obtuse angle relative to the lateral side of the housing during operation via clamps, stands, braces, or any combination thereof.

5. The heating and cooling system of claim 3, wherein the obtuse angle is between 5° and 140°.

6. The heating and cooling system of claim 1, wherein the plurality of fans is coupled to a downstream side of the coil with respect to the airflow, and wherein each fan of the plurality of fans is configured to draw the airflow across the coil.

7. The heating and cooling system of claim 1, comprising a controller, wherein each fan of the plurality of fans is independently controllable via the controller.

8. The heating and cooling system of claim 1, comprising a refrigerant circuit comprising the heat exchanger, wherein the heat exchanger is a condenser.

9. The heating and cooling system of claim 8, comprising a rooftop unit comprising the refrigerant circuit.

10. A heat exchanger system for a heating and cooling system, the heat exchanger system comprising:
a coil configured to flow a refrigerant therethrough, wherein the coil is configured to be pivotably coupled to a housing of the heating and cooling system; and a fan array coupled to and positioned adjacent the coil, wherein the fan array comprises a plurality of fans, and each fan of the plurality of fans is configured to force air across the coil, wherein the heat exchanger system is movably coupled to the housing of the heating and cooling system such that the coil and the fan array are configured to collectively move relative to the housing.

11. The heat exchanger system of claim 10, wherein each fan of the plurality of fans is coupled to a bracket comprising a plurality of receptacles, and wherein each receptacle of the plurality of receptacles comprises the respective fan of the plurality of fans disposed therein.

12. The heat exchanger system of claim 10, further comprising a controller configured to independently adjust an operating parameter of each fan of the plurality of fans.

13. The heat exchanger system of claim 12, wherein the operating parameter comprises a fan speed of the respective fan, an angle of the respective fan relative to the coil, or both.

14. The heat exchanger system of claim 12, wherein the controller is configured to control a first set of the plurality of fans and a second set of the plurality of fans independently from one another.

15. The heat exchanger system of claim 12, wherein the controller is configured to adjust the respective operating parameter of each fan of the plurality of fans based on a size of the respective fan, a distance from the respective fan to the coil, a desired temperature of the air, a temperature of the refrigerant, a desired distribution of the air, or any combination thereof.

16. The heat exchanger system of claim 10, wherein each fan of the plurality of fans comprises a diameter between 1 centimeter and 10 centimeters.

17. The heat exchanger system of claim 10, wherein each fan of the plurality of fans is configured to be positioned from the coil a distance between 0.5 and 5 times a diameter of the fan.

18. The heat exchanger system of claim 10, wherein the fan array is substantially parallel to the coil.

19. A temperature management system, comprising:
a housing; and
a heat exchange section comprising a heat exchanger, wherein the heat exchanger is configured to place an airflow and a refrigerant in thermal communication with one another, wherein the heat exchange section comprises an array of fans coupled to the heat exchanger, wherein the array of fans is configured to blow the airflow across a coil of the heat exchanger, and wherein the heat exchanger is coupled to the housing such that the coil and the array of fans are configured to collectively move relative to the housing.

20. The temperature management system of claim 19, further comprising a controller configured to independently adjust an operating parameter of each fan of the array of fans based on a size of the respective fan, a distance from the respective fan to the coil of the heat exchanger, a temperature of the refrigerant, a desired distribution of the airflow across the coil, or any combination thereof.

21. The temperature management system of claim 19, wherein the heat exchanger is a condenser.

22. The temperature management system of claim 19, wherein the array of fans is disposed along a lateral side of the housing of the temperature management system.

23. The temperature management system of claim 19, wherein the array of fans is coupled to the heat exchanger via a bracket.

* * * * *